United States Patent
Haverkamp et al.

(10) Patent No.: US 12,541,703 B2
(45) Date of Patent: Feb. 3, 2026

(54) MULTITASKING SCHEME FOR QUANTUM COMPUTERS

(71) Applicant: INTERNATIONAL BUSINESS MACHINES CORPORATION, Armonk, NY (US)

(72) Inventors: Frank Haverkamp, Tuebingen (DE); Juergen Saalmueller, Holzgerlingen (DE); Markus Buehler, Schoenbuch (DE); Thilo Maurer, Stuttgart (DE); Tristan Müller, Tübingen (DE); Jeffrey Joseph Ruedinger, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 919 days.

(21) Appl. No.: 17/730,148

(22) Filed: Apr. 26, 2022

(65) Prior Publication Data

US 2023/0342652 A1 Oct. 26, 2023

(51) Int. Cl.
*G06N 10/80* (2022.01)
*G06F 9/50* (2006.01)
*G06N 10/20* (2022.01)

(52) U.S. Cl.
CPC .......... *G06N 10/80* (2022.01); *G06F 9/5066* (2013.01); *G06N 10/20* (2022.01)

(58) Field of Classification Search
CPC ........ G06N 10/80; G06N 10/20; G06N 10/40; G06F 9/5066; G06F 9/4881
See application file for complete search history.

(56) References Cited

U.S. PATENT DOCUMENTS

| 8,250,133 B2 | 8/2012 | Blumrich et al. |
| 10,275,288 B2 | 4/2019 | Pinto et al. |

(Continued)

FOREIGN PATENT DOCUMENTS

| CA | 3112785 A1 | 3/2020 |
| CA | 3174231 A1 | 10/2021 |

(Continued)

OTHER PUBLICATIONS

List of IBM Patents or Patent Applications Treated as Related, 2 Pgs.

(Continued)

*Primary Examiner* — Ryan C Vaughn
(74) *Attorney, Agent, or Firm* — Amin, Turocy & Watson, LLP (57) ABSTRACT

A quantum computing system that supports efficient multitasking receives messages from a classical computing system to a pool of qubits. Each received message is associated with a partition identifier. The system configures a first set of qubits in the pool of qubits to perform a first computing task based on received messages that are associated with a first partition identifier and a second set of qubits in the pool of qubits to perform a second computing task based on received messages that are associated with a second partition identifier. The system acquires a first set of measurements from the first set of qubits and a second set of measurements from the second set of qubits. The system relays the first and second sets of measurements to the classical computing system.

20 Claims, 7 Drawing Sheets

(56) References Cited

U.S. PATENT DOCUMENTS

| | | | |
|---|---|---|---|
| 11,616,498 | B2 | 3/2023 | Cohen et al. |
| 11,888,978 | B1 | 1/2024 | Wang et al. |
| 12,111,352 | B2 | 10/2024 | Ziv et al. |
| 12,182,661 | B2* | 12/2024 | Rigetti ............... G06F 13/1663 |
| 12,242,406 | B2 | 3/2025 | Sivan et al. |
| 12,314,815 | B2 | 5/2025 | Szmuk et al. |
| 2018/0260245 | A1 | 9/2018 | Smith |
| 2021/0173660 | A1 | 6/2021 | Hogaboam et al. |
| 2021/0182071 | A1 | 6/2021 | Khammassi |
| 2021/0248506 | A1 | 8/2021 | Hoskinson et al. |
| 2021/0279625 | A1 | 9/2021 | Shani et al. |
| 2021/0374583 | A1 | 12/2021 | Griffin |
| 2022/0150044 | A1 | 5/2022 | Xiang et al. |
| 2022/0172096 | A1 | 6/2022 | Rudolph |
| 2022/0345304 | A1 | 10/2022 | Taylor |
| 2023/0040849 | A1 | 2/2023 | Shanmugam et al. |
| 2023/0099621 | A1 | 3/2023 | Shi et al. |
| 2023/0153155 | A1 | 5/2023 | Krneta et al. |
| 2023/0236244 | A1 | 7/2023 | Zvi et al. |
| 2023/0315539 | A1* | 10/2023 | Scheps ................ G06N 10/60 718/102 |
| 2023/0342647 | A1 | 10/2023 | Haverkamp et al. |
| 2023/0419157 | A1 | 12/2023 | Wan et al. |

FOREIGN PATENT DOCUMENTS

| | | |
|---|---|---|
| CA | 3206748 A1 | 11/2022 |
| CN | 109217939 B | 12/2020 |
| CN | 113011591 A | 6/2021 |
| CN | 113515165 A | 10/2021 |
| CN | 114528998 A | 5/2022 |
| CN | 116050526 A | 5/2023 |
| CN | 116523057 A | 8/2023 |
| EP | 4515459 A1 | 3/2025 |
| NL | 2026015 | 3/2022 |
| NL | 2029849 | 6/2023 |
| WO | 2020/081805 A1 | 4/2020 |
| WO | 2021/059013 A1 | 4/2021 |
| WO | 2022/123268 A2 | 6/2022 |
| WO | 2022/159847 A1 | 7/2022 |
| WO | 2022/169360 A1 | 8/2022 |
| WO | 2022/169671 A1 | 8/2022 |
| WO | 2023/208815 A1 | 11/2023 |
| WO | 2023/209508 A1 | 11/2023 |

OTHER PUBLICATIONS

Andrés-Martínez, P. et al., "Automated Distribution of Quantum Circuits via Hypergraph Partitioning"; arXiv:1811.10972v5 [quant-ph] (2019); 12 pgs.

Dou, X. et al., "A New Qubits Mapping Mechanism for Multi-Programming Quantum Computing"; Proceedings of the ACM International Conference on Parallel Architectures and Compilation Techniques (2020); 12 pgs.

Niu, S. et al., "Enabling Multi-Programming Mechanism for Quantum Computing in the NISQ Era"; arXiv:2102.05321v1 [cs.AR] (202); 15 pgs.

Das, P. et al., "A Case for Multi-Programming Quantum Computers"; Association for Computing Machinery (2019); 13 pgs.

Corcoles, A. D. et al., "Exploiting Dynamic Quantum Circuits in a Quantum Algorithm with Superconducting Qubits"; arXiv:2102.01682v1 [quant-ph] (2021); 19 pgs.

Steffen, L. et al., "Realization of Deterministic Quantum Teleportation with Solid State Qubits"; arXiv:1302.5621v1 [quant-ph] (2013); 8 pgs.

Chou, K. S., "Deterministic Teleportation of a Quantum Gate Between Two Logical Qubits"; arXiv:1801.05283v1 [quant-ph] (2018); 33 pgs.

Ryan, C. A., et al., "Hardware for Dynamic Quantum Computing"; arXiv:1704.08314v1 [quant-ph (2017); 13 pgs.

Cross, A. et al., "OpenQASM 3: A Broader and Deeper Quantum Assembly Language", arXiv:2104,14722v1 (2021), 54 pgs.

Parekh, R. et al., "Quantum Algorithms and Simulation for Parallel and Distributed Quantum Computing", arXiv:2106.06841.v1 (2021), 7 pgs.

International Search Report and Written Opinion issued Jul. 7, 2023 in related application No. PCT/IB2023/054033, 13 pgs.

Gebauer et al., "A Modular RFSoC-based Approach to Interface Superconducting Quantum Bits" 2021 International Conference on Field-Programmable Technology (ICFPT), 2021, 9 pages.

International Searching Authority, "Notification of Transmittal of the International Search Report and the Written Opinion of the International Searching Authority, or Declaration," Patent Cooperation Treaty Jun. 27, 2023, 11 pages, International Application No. PCT/EP2023/060598.

* cited by examiner

MULTITASKING SCHEME FOR QUANTUM COMPUTERS

BACKGROUND

Technical Field

The present disclosure generally relates to quantum computing.

Description of the Related Arts

Superconducting quantum computing is an implementation of a quantum computer in superconducting electronic circuits. Quantum computation studies the application of quantum phenomena for information processing and communication. Various models of quantum computation exist, and the most popular models include the concepts of qubits and quantum gates. A qubit is a generalization of a bit that has two possible states, but can be in a quantum superposition of both states. A quantum gate is a generalization of a logic gate; however, the quantum gate describes the transformation that one or more qubits will experience after the gate is applied on them, given their initial state. Various quantum phenomena, such as superposition and entanglement, do not have analogs in the world of classical computing and therefore may involve special structures, techniques, and materials.

SUMMARY

Some embodiments of the disclosure provide a quantum computing system that supports efficient multitasking. The system receives messages from a classical computing system to a pool of qubits. Each received message is associated with a partition identifier. The system configures a first set of qubits in the pool of qubits to perform a first computing task based on received messages that are associated with a first partition identifier and a second set of qubits in the pool of qubits to perform a second computing task based on received messages that are associated with a second partition identifier. The system acquires a first set of measurements from the first set of qubits and a second set of measurements from the second set of qubits. The system relays the first and second sets of measurements to the classical computing system.

In one embodiment, the system identifies one or more qubits in the pool of qubits as the first set of qubits and one or more qubits in the pool of qubits as the second set of qubits. The number of qubits in the first set of qubits is dynamically determined based on a size of the first computing task. In some embodiments, the first set of qubits is identified to minimize the overall latency for the first computing task.

In some embodiments, the classical computing system includes first and second sets of computing engines. The messages associated with the first partition identifier are received from the first set of computing engines and the messages associated with the second partition identifier are received from the second set of computing engines. The first set of measurements is relayed to the first set of computing engines and the second set of measurement is relayed to the second set of computing engines. More generally, in some embodiments, the partition identifier of the received message is provided by the classical computing system.

In some embodiments, the partition identifier of each received message is provided by a communications fabric that interconnects the classical computing system with control nodes and acquire nodes for the pool of qubits. The fabric determines the partition identifier based on a channel from which the message is received.

In some embodiments, each qubit in the pool of qubits is addressable by a physical index that is unique within the pool of qubits and each qubit in the first set of qubits is addressable by a local virtual index that is unique within the first set of qubits. For a first message associated with the first partition identifier that uses a first local virtual index to address a first qubit, the system translates the first local virtual index into a first physical index to address the first qubit.

By allocating qubits from a pool of qubits into different logical partitions for different computing tasks, a quantum computing system can more efficiently support multitasking. By associating messages from the classical computing system to the qubits with multicast identifiers, the partitioning of the qubits can be dynamically determined based on real-time information such as the size of the computing tasks and latencies of different qubits in the pool. The resource utilization efficiency of the quantum computing system is therefore improved.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high level, without detail, in order to avoid unnecessarily obscuring aspects of the present teachings.

Some embodiments of the disclosure provide a quantum computing system that supports efficient multitasking. The system executes multiple programs and tasks in a quantum computing system that includes a pool of quantum bits (qubits). Specifically, portioning and virtualization techniques are applied so the pool of qubits can be used to support multiple computing tasks. As the number of available qubits increases, running multiple jobs in parallel makes better use of the qubits as computing resources. Single jobs may not use all the qubits, while some qubits may not function as desired. In some embodiments, qubits are assigned dynamically to different computing tasks. Malfunctioning qubits are excluded, while an appropriate number of qubits are selected and allocated to each computing task. In some embodiments, the assignment or allocation of qubits are transparent to higher levels of computing hierarchy such that for example, repair of malfunctioning qubits may take place without affecting the computing tasks running on functioning qubits. Applications using the quantum computing system need not know the exact status of each physical qubit in the pool of qubits.

In some embodiments, the system defines multiple groups or partitions of qubits that are individually controlled. The system may start with only one group or partition of qubits, split into N groups of different numbers of qubits, rejoined, re-allocated or re-partitioned into M groups of different numbers of qubits, etc. The control of the different groups of qubits can be done sequentially by one computing thread, or by multiple cores or multiple threads to drive multiple groups of qubits in parallel. In some embodiments, multicast groups are defined to correspond to different groups or partitions of qubits. In some embodiments, an index re-mapping scheme is adopted to transform one large physical quantum computing system into multiple logical quantum computing systems, specifically by mapping physical addresses to virtual/logical/local indices and vice versa. The re-mapping scheme may be disabled so each qubit can be addressed directly using their true physical addresses.

Figure 1:
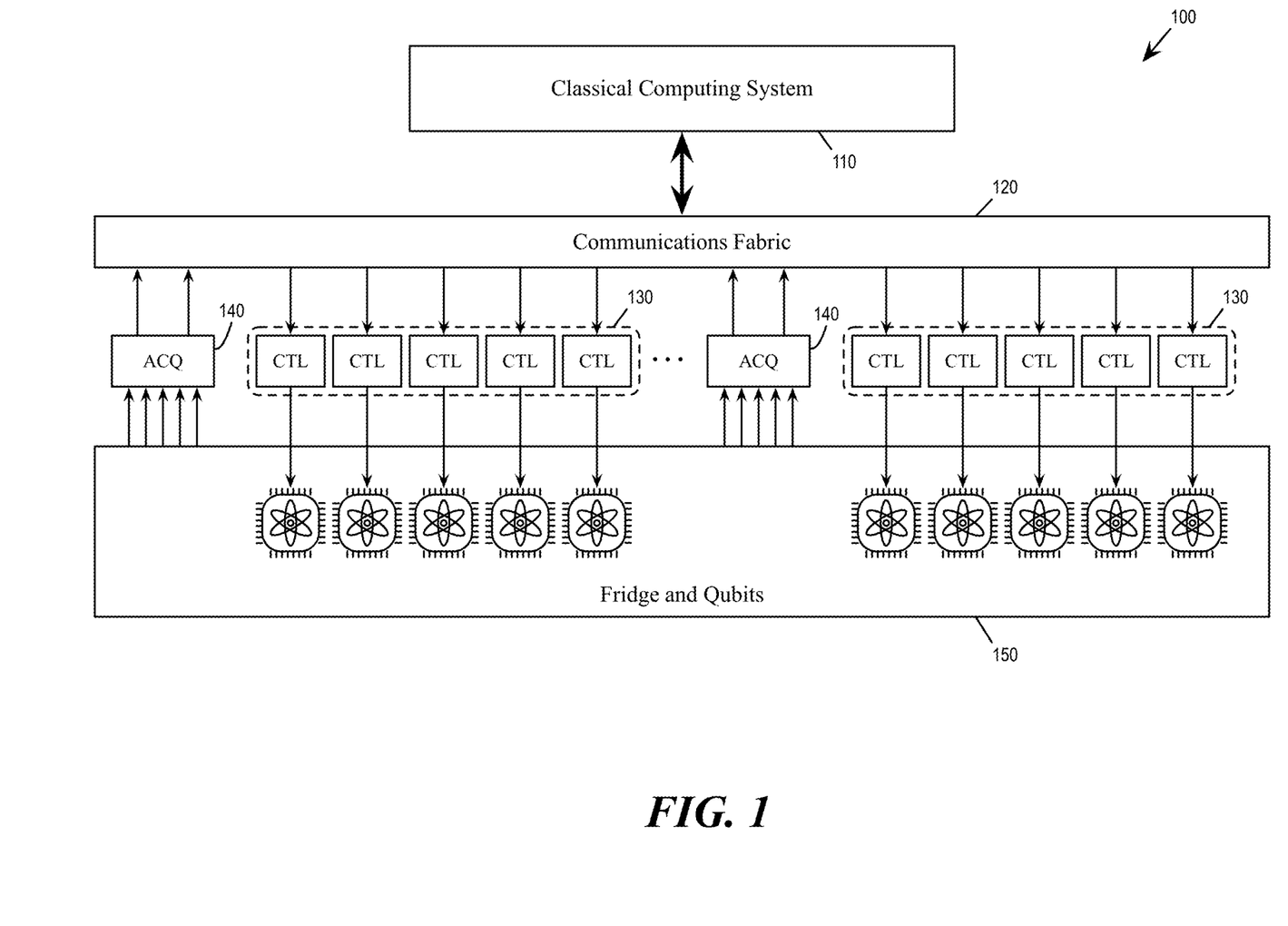
FIG. 1 illustrates an example quantum computing system that supports efficient multitasking, consistent with an illustrative embodiment.

For some embodiments, FIG. 1 illustrates an example quantum computing system 100 that supports efficient multitasking, consistent with an exemplary embodiment. The system includes a classical computing system 110, a communications fabric 120, control nodes 130, acquire nodes 140, and a pool of qubits 150. To perform a computing task using the quantum computing system 100, the classical computing system 110 configures the qubits 150 to perform specific quantum computing tasks.

The classical computing system 110 includes one or more computing engines or computing devices performing computing tasks in the classical domain. The computing engines of the classical computing system 110 may operate multiple threads or may have multiple cores that can run different algorithms or programs in parallel. The classical computing system 110 can manage overall program flow and determines the timing of computing tasks or actions. The classical computing system 110 sends information by broadcast to all control nodes 140 or by multicast to different groupings or partitions of control nodes. The classical computing system 110 can also make global decisions based on qubit values or measurements gathered by acquire nodes 140.

The fabric 120 is a network fabric for relaying messages or signals from the classical computing system 110 to the control nodes 130 and from the acquire nodes 140 back to the classical computing system 110. The fabric may forward a packet to a specific destination based on an address, broadcast a packet to all destinations, or multicast a packet to a specific group of destinations based on a multicast identifier. In some embodiments, the fabric may map address from one domain to another domain. The fabric may also include components that insert multicast identifiers into packets.

The control nodes 130 refer to components that control individual qubits. The control nodes 130 are also network endpoints that receive the messages or signals sent by the classical computing system 110. Each control node is a computing device that may execute codes or run parts of an algorithm or program. Each control node may also make local decisions based on qubit values or measurements.

The acquire nodes 140 refer to components that receive measurements from qubits. Each acquire node may be a shared receiver that gathers measurements from multiple qubits. The acquire nodes 140 can also be network endpoints that relay the measurements back to the classical computing system 110.

The pool of qubits 150 includes an array or an arrangement of qubits that can be configured to perform quantum computing tasks. Individual qubits may be implemented by superconducting devices in a cryostat. Each qubit can be configured by one of the control nodes 130 and can be measured by one of the acquire nodes 140.

Figure 2:
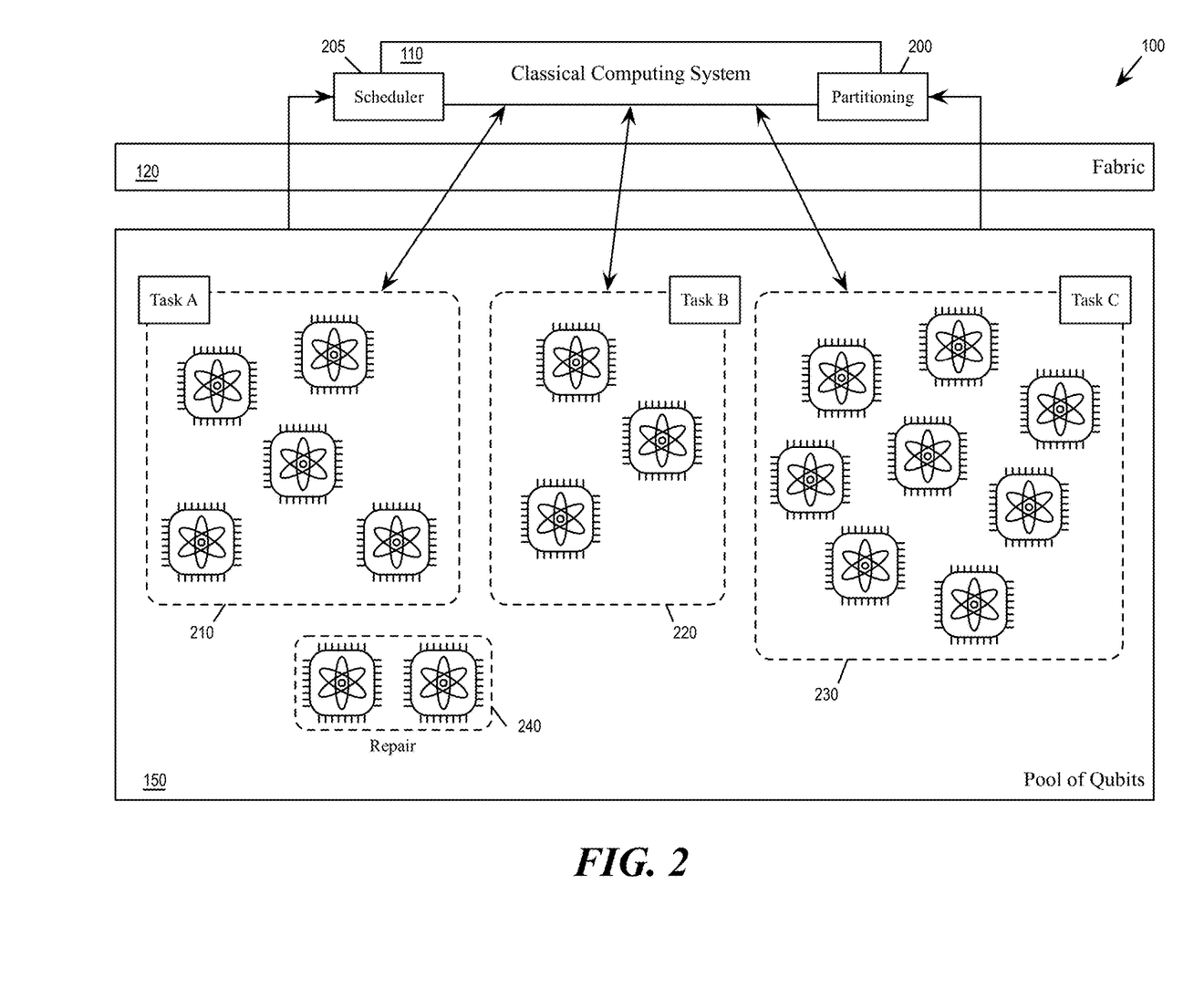
FIG. 2 conceptually illustrates logical groupings of qubits being used to process different computing tasks, consistent with an illustrative embodiment.

As mentioned, in some embodiments, the pool of qubits 150 may be logically divided into multiple groups or partitions, wherein different groups of qubits may be configured to perform different computing tasks. FIG. 2 conceptually illustrates logical groupings of qubits being used to process different computing tasks.

As illustrated, the classical computing system 110 dispatches computing tasks to different groups or partitions of qubits in the pool of qubits 150. Each logical partition or grouping of qubits is a set of one or more qubits. In the example, computing task A is dispatched to a first qubit partition 210. Computing task B is dispatched to a second qubit partition 220. Computing task C is dispatched to a third qubit partition 230. The pool of qubits 150 can also include several qubits 240 that are marked as unavailable or malfunctioning and are not allocated for any computing tasks. They may be under repair while the other qubits in the pool 150 are actively used to perform quantum computing tasks.

In some embodiments, the classical computing system 110 includes a partitioning module 200 that is used to control the partitioning of the pool of qubits. 150. In some embodiments, the partitioning module 200 may operate as a layer in a software stack of the classical computing system 110. The partitioning module 200 monitors the status of the qubits in the pool 150 as well as the requirements of the algorithms being run at the classical computing system 110 to determine the partitioning of the qubits in the pool 150. In the example of FIG. 2, the partitioning module 200 identifies five qubits from the pool 150 to be in the first qubit partition 210, three qubits from the pool 150 to be in the second qubit partition 220, eight qubits from the pool 150 to be in the third qubit partition. The partitioning module 200 also identifies the malfunctioning qubits 240 and excludes them from the any of the partitions.

The partitioning module 200 may create new partitions, delete existing partitions, and determine the sizes of the different partitions. The partitioning module 200 may make this determination dynamically based on the requirements of the algorithms being run in the classical computing system 110. In the example illustrated, the partitioning module identifies sufficient numbers of qubits to be included in each of the partitions 210, 220, and 230 for computing tasks A, B, C, respectively.

In some embodiments, the classical computing system 110 includes a scheduling module 205 that is used to optimize the partitioning with respect to latency. The scheduler 205 may operate as a layer in a software stack of the classical computing system 110 and/or as a part of the partitioning module 200. A qubit performing quantum computing has a limited lifetime, e.g., the time duration of how long the qubit stays in superposition to compute with multiple logical states is limited. This qubit lifetime may be different from qubit to qubit based on the computing task being performed. Furthermore, hierarchical structure of the network fabric and the compute engines may result in communication paths between some qubits being longer than between others because they may have to pass through more stages in the hardware. Thus, signaling with different qubits may experience different latencies depending on the physical positions of the different qubits. The scheduler 205 optimizes partitioning by identifying suitable qubits such that algorithms running on the partitions can experience the lowest possible latency or at least be feasible. For example, the scheduler may consider (i) different lifetime requirements of the different algorithms and (ii) different latencies in the network when identifying the qubits to include in a partition.

The fabric 120 may identify messages from the classical computing system 110 as belonging to a particular partition, and the fabric relay messages to only the control nodes of the subset of the qubits 150 that are identified as belonging to that particular partition. In some embodiments, the messages destined for different qubit partitions are delivered as multicast packets for different multicast groups with different multicast identifiers. Each partition of qubits is assigned a partition identifier that is used as the multicast identifier for the partition.

Figure 3:
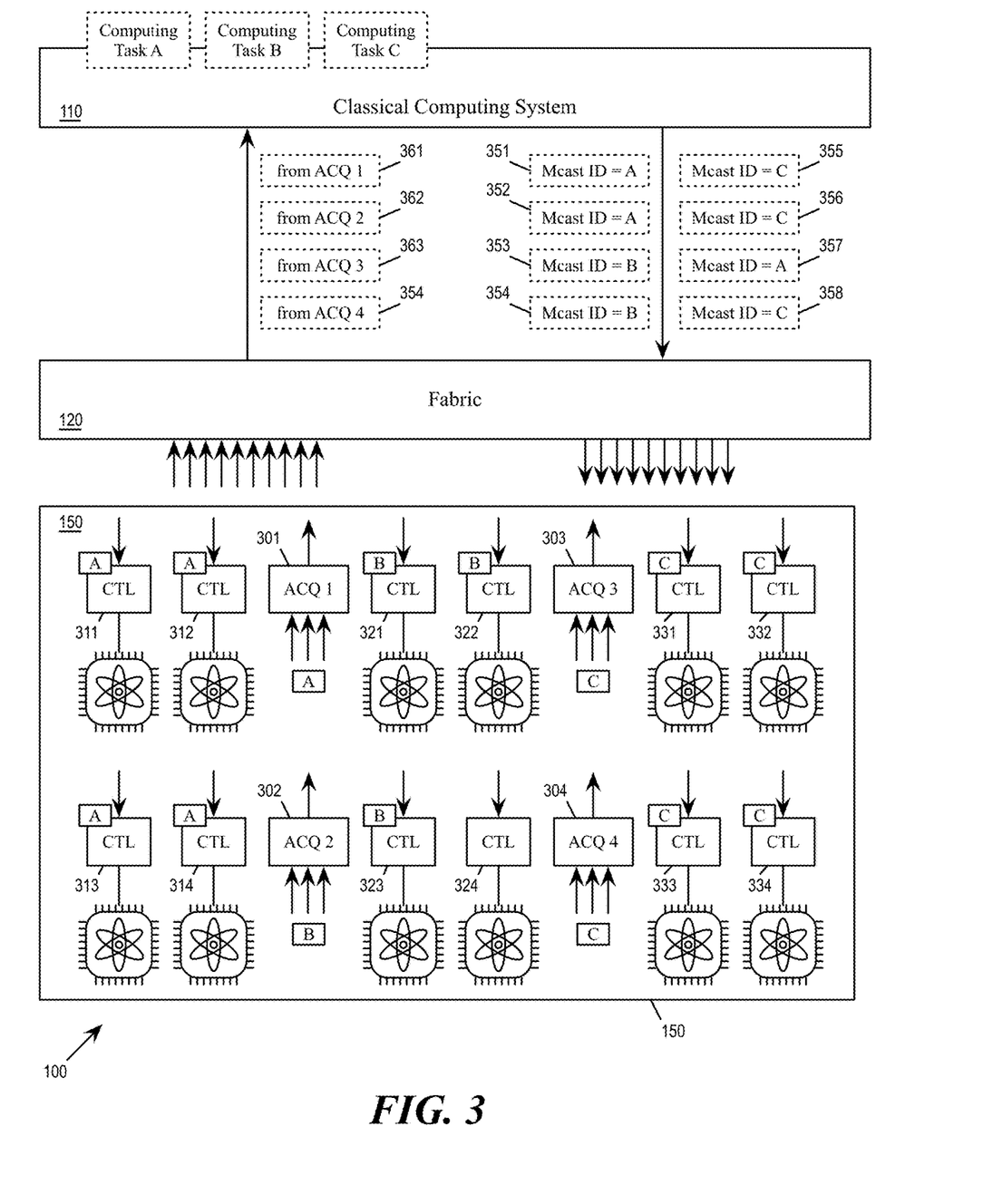
FIG. 3 conceptually illustrates using multicast identifiers to deliver messages from the classical computing system to different partitions of qubits, consistent with an illustrative embodiment.

FIG. 3 conceptually illustrates using multicast identifiers to deliver messages from the classical computing system 110 to different partitions of qubits. The classical computing system 110 is conducting three computing tasks A, B, and C using quantum computing resources in the pool of qubits 150. Messages from classical computing system 110 are tagged with multicast identifiers (or partition identifier). The fabric 120 delivers the messages or packets as multicast packets to network endpoints. Network endpoints that correspond to a particular partition of qubits will accept multicast packets with the multicast identifier of the particular partition.

In the example of FIG. 3, control nodes 311-314 control qubits that are allocated to partition 'A' and are configured to receive multicast packets with multicast identifier 'A'. Control nodes 321-323 control qubits that are allocated to partition 'B' and are configured to receive multicast packets with multicast identifier 'B'. Control nodes 331-336 control qubits that are allocated to partition 'C' and are configured to receive multicast packets with multicast identifier 'C'. Thus, the classical computing system 110 may send messages to partition 'A' by sending multicast packets with multicast identifier 'A' (e.g., packets 351, 352, and 357), messages to partition 'B' by sending multicast packets with multicast identifier 'B' (e.g., packets 353, 354), and messages to partition 'C' by sending multicast packets with multicast identifier 'C' (e.g., packets 355, 356, 358).

The classical computing system 110 also receives measurement results of from acquire nodes 301-304 (e.g., packets 361-364). In this example, the acquire node 301 (ACQ 1) is configured to receive measurements from qubits of partition A, the acquire node 302 (ACQ 2) is configured to receive measurements from qubits of partition B, and the acquire nodes 303 and 304 (ACQ 3 and ACQ 4) are configured to receive measurements from qubits of partition C.

In the example of FIG. 3, the network endpoints such as the computing engines of the classical computing system 110 and the control nodes insert the partition ID as multicast identifier into their messages and the fabric routes the messages to all recipients and the recipients discarding messages not being addressed to their partition. In some other embodiments, the fabric 120 (rather than the classical computing system 110) inserts partition IDs into the messages based on which channels the messages are incoming from and routs the messages to recipients based on the inserted partition IDs. Thus, hardware implements the partitioning and guarantees isolation, and partitioning is transparent to the software stack running in the classical computing system 110.

Figure 4:
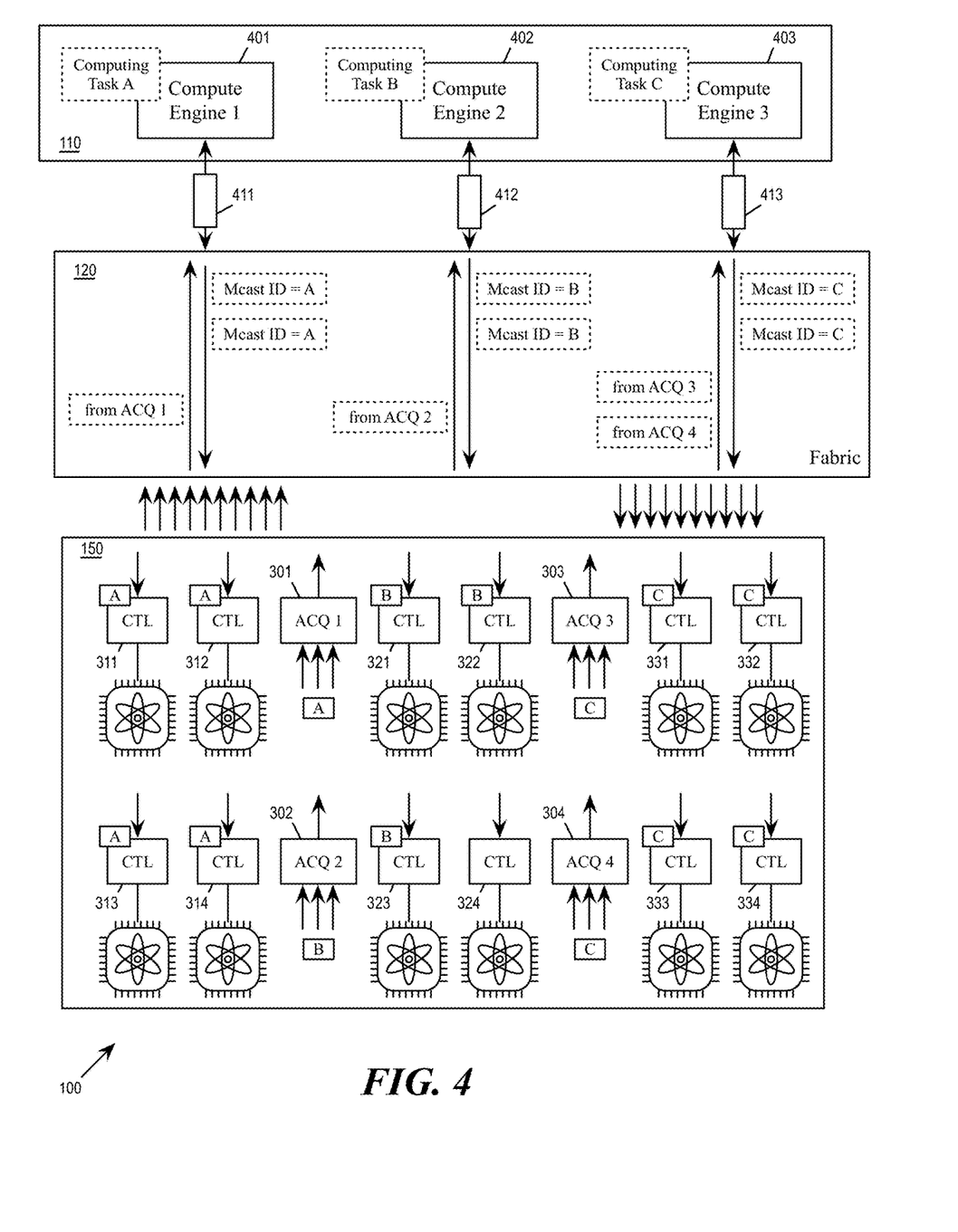
FIG. 4 conceptually illustrates the fabric assigning multicast identifiers based on incoming channels for sending messages to different partitions of qubits, consistent with an illustrative embodiment.

FIG. 4 conceptually illustrates the fabric assigning multicast identifiers based on incoming channels for sending messages to different partitions of qubits. The example of FIG. 4 has the same partitions of qubits as the example of FIG. 3 (partitions A, B, and C). However, unlike in FIG. 3, the classical computing system 110 uses multiple different channels to send messages through the fabric 120 to the partitions of qubits. Specifically, the classical computing system 110 has three computing engines 401-403 that interface the fabric 120 in three channels 411-413, respectively. The computing engine 401 is controlling computing task 'A' using the partition 'A' in the pool of qubits 150. The computing engine 402 is controller computing task 'B' using the partition 'B'. The computing engine 403 is controlling computing task 'C' using the partition 'C'.

When the fabric 120 receives a message from the channel 411, it tags the message with multicast identifier 'A', which allows it to reach control nodes 311-314 (partition 'A'). When the fabric 120 receives a message from the channel 412, it tags the message with multicast identifier 'B', which allows it to reach control nodes 321-323 (partition 'B'). When the fabric 120 receives a message from the channel 413, it tags the message with multicast identifier 'C', which allows it to reach control nodes 331-334 (partition 'C').

In some embodiments, the algorithms running in the classical computing engine 110 can address or identify individual qubits. An algorithm or a part of an algorithm using a logical partition of qubits may address individual qubits by using virtual indices that are local to the logical partition. In some embodiments, an index re-mapping scheme is adopted to map physical addresses of qubits into virtual/logical/local indices in individual partition domains (and vice versa), thereby transforming one large physical quantum computing system into multiple logical quantum computing systems.

Figure 5:
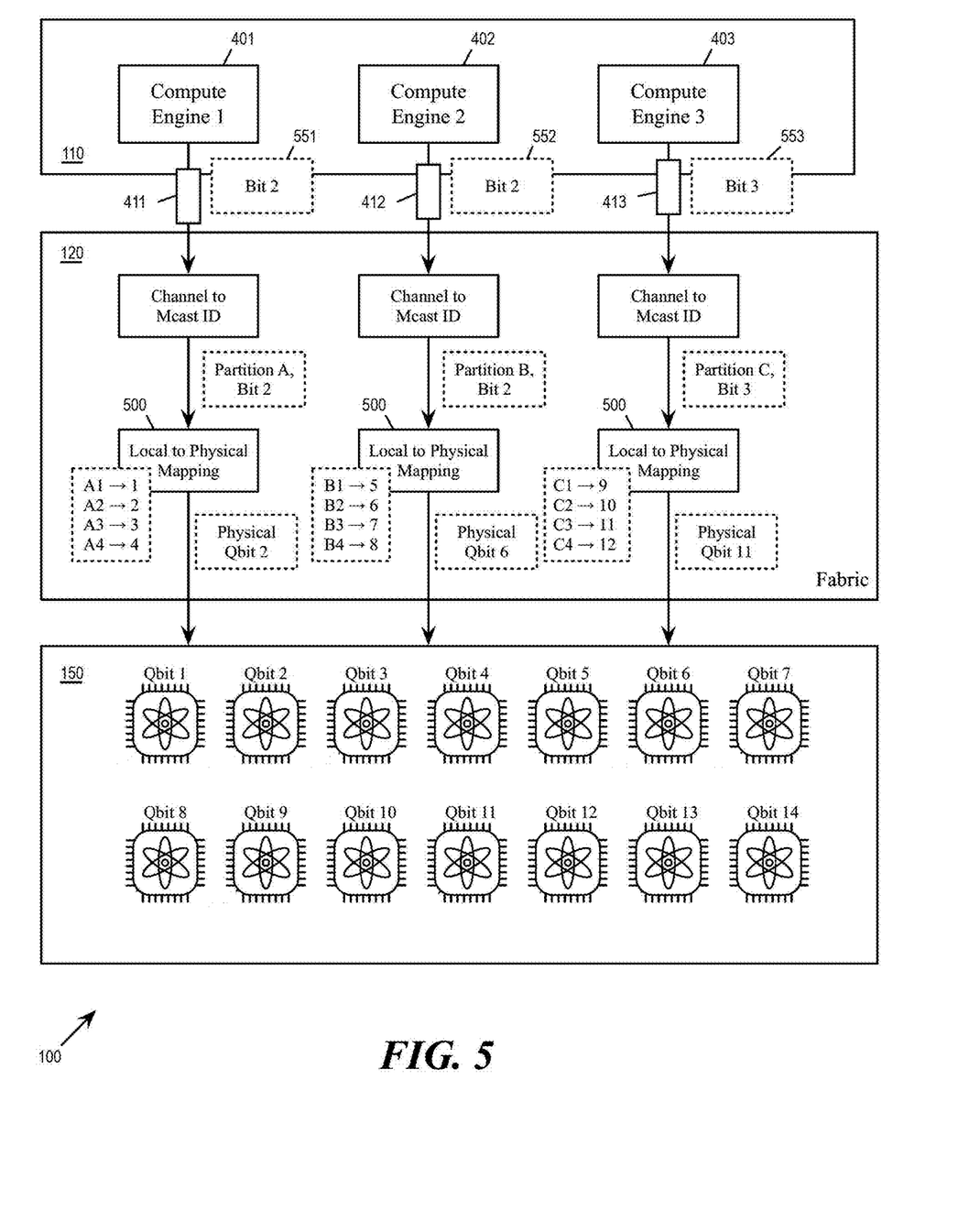
FIG. 5 conceptually illustrates using local virtual addresses of logical partitions to address the qubits in the quantum computing system, consistent with an illustrative embodiment.

FIG. 5 conceptually illustrates using local virtual addresses of logical partitions to address the qubits in the quantum computing system. In the example, the compute engine 401 in a message 551 specifies a local virtual address "Bit 2". Since the compute engine 401 uses the channel 411 to send the message 551, the fabric tags the message 551 with multicast ID for a logical partition "partition A". A local to physical mapping 500 maps the local virtual address of the logical partition to a physical address that uniquely identifies a qubit in the pool 150, which includes 14 qubits, respectively identified as Qbits 1-14. In this case, "Bit 2" of "partition A" is translated to a physical address "Qbit 2", which uniquely identifies "Qbit 2" (or a corresponding control node) in the pool 150.

The compute engine 402 in a message 552 can also specify a local virtual address "Bit 2". Since the compute engine 402 uses the channel 412 to send the message 552, the fabric tags the message 552 with multicast ID for a logical partition "partition B". The local to physical mapping 500 then maps "Bit 2" of "partition B" to a physical address "Qbit 6", which uniquely identifies "Qbit 6" in the pool 150.

The compute engine 403 in a message 553 specifies a local virtual address "Bit 3". The fabric tags the message 553 with multicast ID for a logical partition "partition C" because the message is from the channel 413. The local to physical mapping 500 then maps "Bit 3" of "partition C" to a physical address "Qbit 11", which uniquely identifies "Qbit 11" in the pool 150.

In the example of FIG. 5, the computing engines of the classical computing system 110 need not be aware of the logical partitioning (as the multicast identifier is inserted by the fabric 120 based on the incoming channel). Thus, the computing engines may rely on the local virtual address to address individual qubits. On the other hand, in some embodiments in which the computing engines in the classical computing system 110 are aware of the logical partitioning in the pool of qubits (such as in the example described by reference to FIG. 3 above), the computing engines may use either local virtual address or the physical address to address individual qubits.

Figure 6:
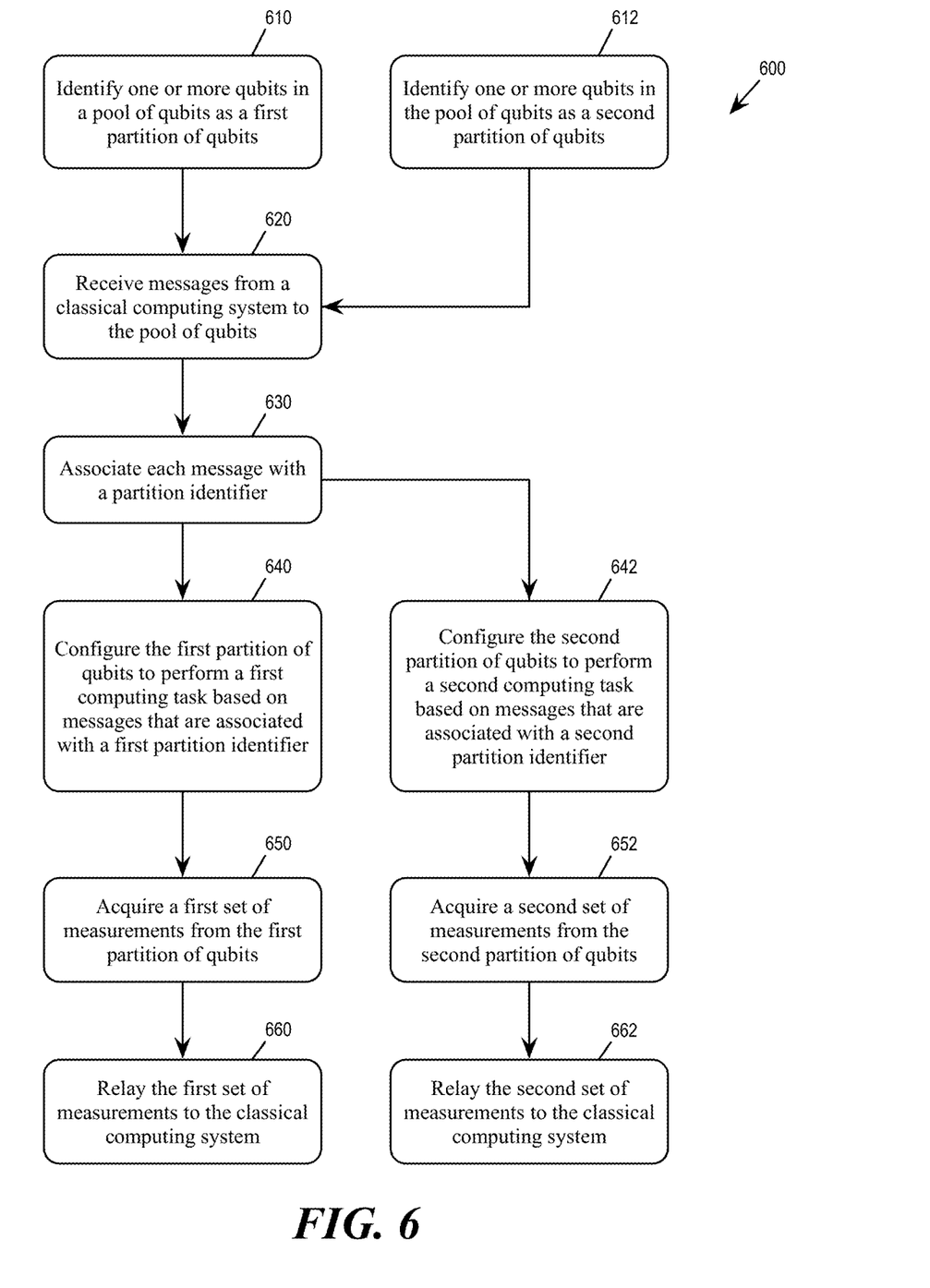
FIG. 6 conceptually illustrates a process for using different groups or partitions of qubits to perform multiple different computing tasks, consistent with an illustrative embodiment.

FIG. 6 conceptually illustrates a process 600 for using different groups or partitions of qubits to perform multiple different computing tasks, consistent with an illustrative embodiment. In some embodiments, one or more processing units (e.g., processor) of a computing device implementing quantum computing system 100 perform the process 600 by executing instructions stored in a computer readable medium. Such a computing device may implement one or more of the computing engines of the classical computing system 110, or one or more network components of the fabric 120.

The system identifies (at block 610) one or more qubits in a pool of qubits as a first logical partition of qubits. The system may also identify (at block 612) one or more qubits in the pool of qubits as a second logical partition of qubits, or any other additional logical partitions. In some embodiments, the system identifies each logical partition based on the requirements of a computing task. The system may identify a first logical partition of qubits based on the requirement of a first computing task and a second logical partition of qubits based on the requirement of a second computing task. For example, the system may determine the total number of qubits to be included in the first partition based on the size of the first computing task, and may do so dynamically based on the any real-time update to the requirements of the first computing task, such as the size of the task. Furthermore, since different qubits in the pool of qubits may have different lifetimes and have different interconnect paths, the system may identify the qubits of each logical partition to minimize the overall latency of the computing task being assigned to the logical partition. For example, this operation may be performed by the partitioning module 200 and/or the scheduler module 205.

The system receives (at block 620) messages from the classical computing system to the pool of qubits. The system also associates (at block 630) each received message with a partition (or multicast) identifier. In some embodiments, the partition identifier of the received message is provided by the classical computing system. The classical computing system may include multiple sets of computing engines, the messages associated with the first partition identifier received from a first set of computing engines, and the messages associated with the second partition identifier received from a second set of computing engines. In some embodiments, the partition identifiers of the received messages are provided by the communications fabric, which determines the partition identifier of each message based on the channel from which the message is received.

The system configures (at block 640) the first partition of qubits to perform the first computing task based on the received messages that are associated with the first partition identifier. The system may also configure (at block 642) the second partition of qubits to perform the second computing task based on the received messages that are associated with the second partition identifier. In some embodiments, each qubit in the pool of qubits is addressable by a physical index that is unique within the pool of qubits and each qubit in a logical partition of qubits is addressable by a local virtual index that is unique within the partition of qubits. Thus, a message for a logical partition may use a local virtual index to address a qubit in a logical partition. The fabric may use a mapping table to translate the local virtual index into a physical index to address the qubit.

The system acquires (at block 650) a first set of measurements from the first partition of qubits. The system may also acquire (at block 652) a second set of measurements from the second set of qubits. The system relays (at block 660) the first set of measurements to the classical computing system. The system may also relay (at block 662) the second set of measurements to the classical computing system. In some embodiments, the first set of measurements is relayed to the first set of computing engines and the second set of measurement is relayed to the second set of computing engines.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 6) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
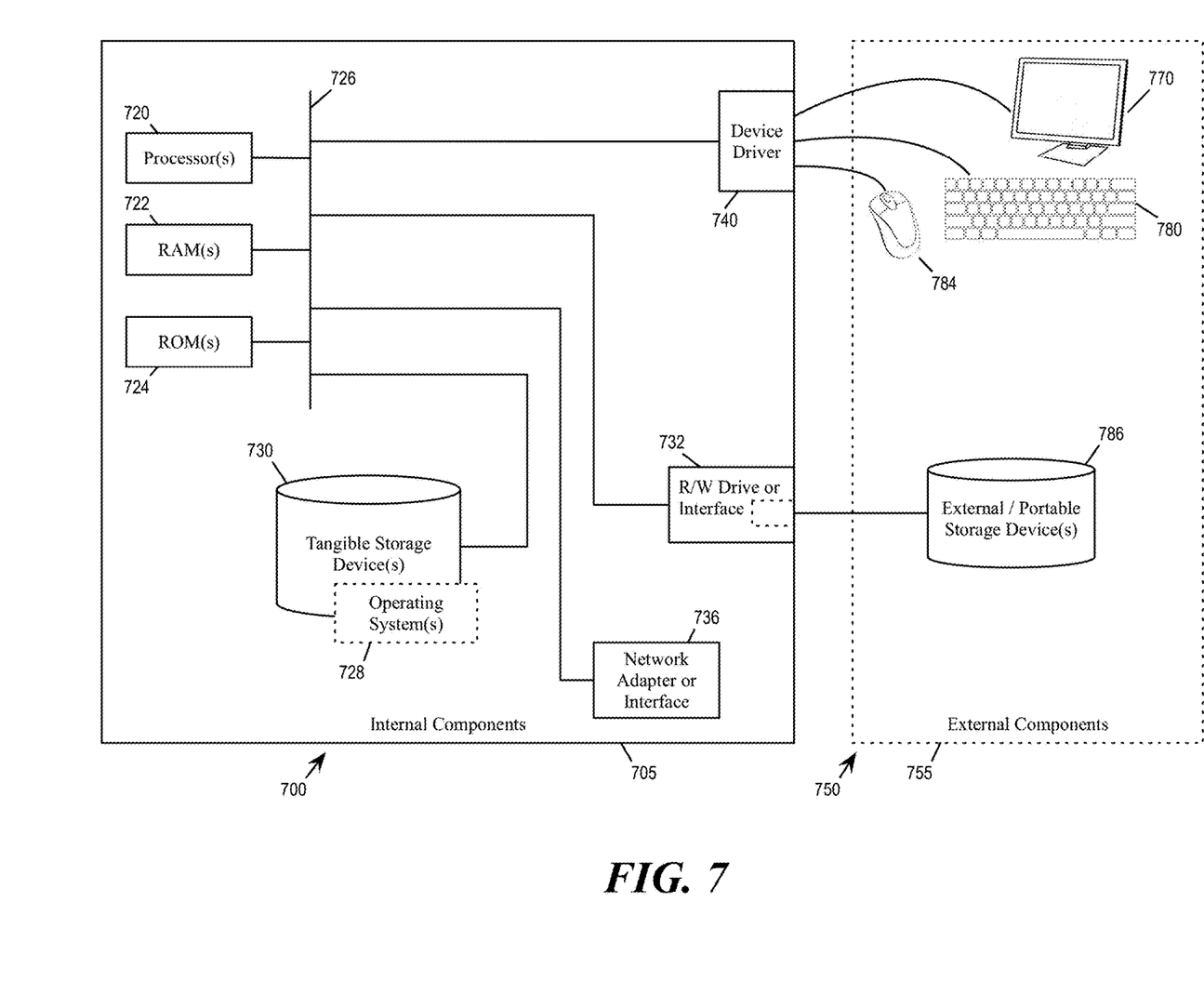
FIG. 7 shows a block diagram of the components of a data processing system in accordance with an illustrative embodiment of the present disclosure.

FIG. 7 shows a block diagram of the components of data processing systems 700 and 750 that may be used to implement a quantum computing system that supports efficient multitasking (e.g., the quantum computing system 100) in accordance with an illustrative embodiment of the present disclosure. It should be appreciated that FIG. 7 provides only an illustration of one implementation and does not imply any limitations with regard to the environments in which different embodiments may be implemented. Many modifications to the depicted environments may be made based on design and implementation requirements.

Data processing systems 700 and 750 are representative of any electronic device capable of executing machine-readable program instructions. Data processing systems 700 and 750 may be representative of a smart phone, a computer system, PDA, or other electronic devices. Examples of computing systems, environments, and/or configurations that may represented by data processing systems 700 and 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 700 and 750 may include a set of internal components 705 and a set of external components 755 illustrated in FIG. 7. The set of internal components 705 includes one or more processors 720, one or more computer-readable RAMs 722 and one or more computer-readable ROMs 724 on one or more buses 726, and one or more operating systems 728 and one or more computer-readable tangible storage devices 730. The one or more operating systems 728 and programs such as the programs for executing the process 600 are stored on one or more computer-readable tangible storage devices 730 for execution by one or more processors 720 via one or more RAMs 722 (which typically include cache memory). In the embodiment illustrated in FIG. 7, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

The set of internal components 705 also includes a R/W drive or interface 732 to read from and write to one or more portable computer-readable tangible storage devices 786 such as a CD-ROM, DVD, memory stick, magnetic tape, magnetic disk, optical disk or semiconductor storage device. The instructions for executing the process 600 can be stored on one or more of the respective portable computer-readable tangible storage devices 786, read via the respective R/W drive or interface 732 and loaded into the respective hard drive 730.

The set of internal components 705 may also include network adapters (or switch port cards) or interfaces 736 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 736. From the network adapters (or switch port adaptors) or interfaces 736, the instructions and data of the described programs or processes are loaded into the respective hard drive 730. The network may comprise copper wires, optical fibers, wireless transmission, routers, firewalls, switches, gateway computers and/or edge servers.

The set of external components 755 can include a computer display monitor 770, a keyboard 780, and a computer mouse 784. The set of external components 755 can also include touch screens, virtual keyboards, touch pads, pointing devices, and other human interface devices. The set of internal components 705 also includes device drivers 740 to interface to computer display monitor 770, keyboard 780 and computer mouse 784. The device drivers 740, R/W drive or interface 732 and network adapter or interface 736 comprise hardware and software (stored in storage device 730 and/or ROM 724).

The foregoing one or more embodiments implements quantum computing system within a computer infrastructure by having one or more computing devices dynamically identifying qubits to be included in different logical partitions. The computer infrastructure is further used to insert multicast identifiers for different logical partitions of qubits and to convert local virtual addresses into physical address of qubits.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving messages from a classical computing system to a plurality of quantum bits (qubits), wherein each received message is associated with a partition identifier;
configuring a first set of qubits in the plurality of qubits to perform a first computing task based on received messages that are associated with a first partition identifier, and a second set of qubits in the plurality of qubits to perform a second computing task based on received messages that are associated with a second partition identifier, wherein each qubit in the plurality of qubits is addressable by a physical index that is unique within the plurality of qubits and each qubit in the first set of qubits is addressable by a local virtual index that is unique within the first set of qubits;
acquiring a first set of measurements from the first set of qubits and a second set of measurements from the second set of qubits; and
relaying the first and second sets of measurements to the classical computing system.

2. The computer-implemented method of claim 1, further comprising identifying one or more qubits in the plurality of qubits as the first set of qubits and identifying one or more qubits in the plurality of qubits as the second set of qubits.

3. The computer-implemented method of claim 2, wherein:
the first set of qubits is identified to minimize the overall latency for the first computing task.

4. The computer-implemented method of claim 2, wherein a number of qubits in the first set of qubits is dynamically determined based on a size of the first computing task.

5. The computer-implemented method of claim 1, wherein the classical computing system comprises first and second sets of computing engines, wherein the messages associated with the first partition identifier are received from the first set of computing engines and the messages associated with the second partition identifier are received from the second set of computing engines.

6. The computer-implemented method of claim 5, wherein the first set of measurements is relayed to the first set of computing engines and the second set of measurements is relayed to the second set of computing engines.

7. The computer-implemented method of claim 1, wherein the partition identifier of the received message is provided by the classical computing system.

8. The computer-implemented method of claim 1, wherein the partition identifier of each received message is provided by a communications fabric that interconnects the classical computing system with control nodes and acquire nodes for the pool of qubits and determines the partition identifier based on a channel from which the message is received.

9. The computer-implemented method of claim 1, wherein a first message associated with the first partition identifier uses a first local virtual index to address a first qubit, the method further comprising translating the first local virtual index into a first physical index to address the first qubit.

10. A computing device comprising:
   a processor; and
   a storage device storing a set of instructions, wherein an execution of the set of instructions by the processor configures the computing device to perform acts comprising:
      receiving messages from a classical computing system to a plurality of quantum bits (qubits), wherein each received message is associated with a partition identifier;
      configuring a first set of qubits in the plurality of qubits to perform a first computing task based on received messages that are associated with a first partition identifier and a second set of qubits in the plurality of qubits to perform a second computing task based on received messages that are associated with a second partition identifier, wherein each qubit in the plurality of qubits is addressable by a physical index that is unique within the plurality of qubits and each qubit in the first set of qubits is addressable by a local virtual index that is unique within the first set of qubits;
      acquiring a first set of measurements from the first set of qubits and a second set of measurements from the second set of qubits; and
      relaying the first and second sets of measurements to the classical computing system.

11. The computing device of claim 10, wherein an execution of the set of instructions by the processor further configures the computing device to perform acts comprising:
   identifying one or more qubits in the plurality of qubits as the first set of qubits and identifying one or more qubits in the plurality of qubits as the second set of qubits.

12. The computing device of claim 11, wherein the first set of qubits is identified to minimize the overall latency for the first computing task.

13. The computing device of claim 11, wherein a number of qubits in the first set of qubits is dynamically determined based on a size of the first computing task.

14. The computing device of claim 10, wherein the classical computing system comprises first and second sets of computing engines, wherein the messages associated with the first partition identifier are received from the first set of computing engines and the messages associated with the second partition identifier are received from the second set of computing engines.

15. The computing device of claim 10, wherein the partition identifier of the received message is provided by the classical computing system.

16. The computing device of claim 10, wherein the partition identifier of each received message is provided by a communications fabric that interconnects the classical computing system with control nodes and acquire nodes for the pool of qubits and determines the partition identifier based on a channel from which the message is received.

17. The computing device of claim 10, wherein:
   a first message associated with the first partition identifier uses a first local virtual index to address a first qubit; and
   an execution of the set of instructions by the processor further configures the computing device to translate the first local virtual index into a first physical index to address the first qubit.

18. A computer program product comprising:
   one or more non-transitory computer-readable storage devices and program instructions stored on at least one of the one or more non-transitory storage devices, the program instructions executable by a processor, the program instructions comprising sets of instructions for:
      receiving messages from a classical computing system to a plurality of quantum bits (qubits), wherein each received message is associated with a partition identifier;
      configuring a first set of qubits in the plurality of qubits to perform a first computing task based on received messages that are associated with a first partition identifier and a second set of qubits in the plurality of qubits to perform a second computing task based on received messages that are associated with a second partition identifier, wherein each qubit in the plurality of qubits is addressable by a physical index that is unique within the plurality of qubits and each qubit in the first set of qubits is addressable by a local virtual index that is unique within the first set of qubits;
      acquiring a first set of measurements from the first set of qubits and a second set of measurements from the second set of qubits; and
      relaying the first and second sets of measurements to the classical computing system.

19. The computer program product of claim 18, wherein the sets of instructions further comprising instructions for:
   identifying one or more qubits in the plurality of qubits as the first set of qubits; and
   identifying one or more qubits in the plurality of qubits as the second set of qubits, wherein the first set of qubits is identified to minimize the overall latency for the first computing task.

20. The computer program product of claim 18, wherein a first message associated with the first partition identifier uses a first local virtual index to address a first qubit, and the sets of instructions further comprising an instruction for translating the first local virtual index into a first physical index to address the first qubit.

* * * * *